Figure 1:
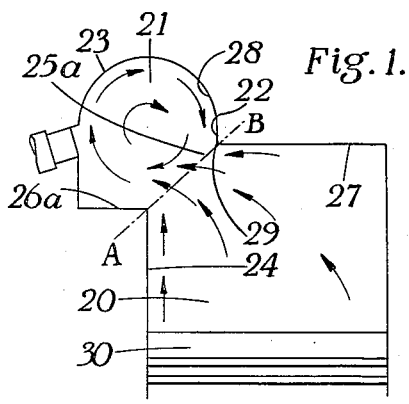

Oct. 19, 1937.   A. F. SANDERS   2,096,527

COMBUSTION CHAMBER FOR FUEL INJECTION ENGINES

Original Filed June 26, 1935

Inventor
Arthur F. Sanders
by Mawhinney & Mawhinney
Attorneys.

Patented Oct. 19, 1937

2,096,527

UNITED STATES PATENT OFFICE 2,096,527

COMBUSTION CHAMBER FOR FUEL-INJECTION ENGINES

Arthur Freeman Sanders, Leeds, England, assignor of one-half to John Fowler & Co. (Leeds) Limited, Leeds, Yorkshire, England Original application June 26, 1935, Serial No. 28,561. Divided and this application September 23, 1936, Serial No. 102,202. In Great Britain July 28, 1934

3 Claims. (Cl. 123—32)

This application is divided out of my co-pending application Serial No. 28,561 filed 26th June 1935.

The invention relates to the combustion chambers of fuel-injection engines, and particularly to such as operate with compression ignition.

In the case of fuel-injection engines it is well known that towards the end of the compression stroke, and just prior to injection of fuel and/or to the initiation of combustion, the gaseous charge may have advantageously motion of two types. The first comprises massive vortex or swirl motion—that is, practically the whole charge is moving in one or more main vortices which serve to assist in pulverizing the fuel on injection or on segregation on ledges and to draw the stream of pulverized fuel as a streamer round the main compression chamber. The second comprises a confusion of multiple small vortices producing non-directional turbulence which disseminates and broadens the streamer of fuel or initially-ignited charge throughout the whole charge. This turbulence is relatively transient, as turbulence produced by the entry of charge into the cylinder is mainly damped out during the compression stroke. Hence it is advantageous to restore or intensify such turbulence towards the end of the compression stroke and during the injection and/or ignition period and during earlier post ignition or expansion stages of combustion.

In the case of such engines of the direct-injection type, i. e., those in which the compression chamber is an extension of the cylinder bore into which the fuel is directly injected, the vortex motion is indefinite and the turbulence slight as there is little or no renewal of such turbulence during compression, hence poor running is the result.

In the case of certain types of compression-ignition engine employing what is now commonly known as an air cell (that is, an auxiliary chamber into which the fuel is injected and which usually communicates with the cylinder bore by a restricted and relatively long passage, this air cell forming substantially the whole of the compression space), the configuration of such air cell is such that severe vortex action is set up during compression but turbulence is deficient. Further due to the flow of gaseous charge through the restricted passage and to excessive vortex motion cooling of the charge heated by compression renders starting from cold difficult, unless excessive compression ratios or some independent ignition or heating device be used.

The main object of the present invention is to provide an improved compression-ignition engine of the air-cell type with which the above disadventages will be obviated. But the invention can with advantage also be applied to fuel-injection electric-ignition engines.

In the accompanying drawing, which illustrates a type of combustion chamber for compression-ignition engines according to the invention:—

Figure 2:
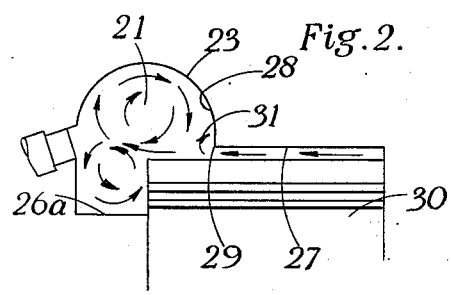
Figure 3:
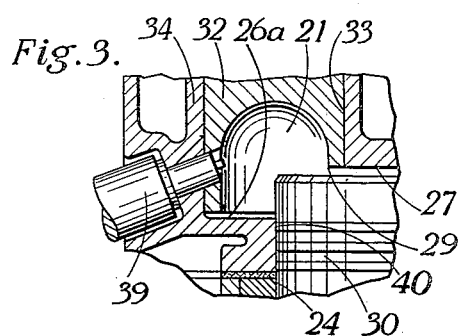

Figure 1 is a diagram indicating the motion of the charge during the compression stroke at the beginning thereof;

Figure 2 is a view similar to that of Figure 1 indicating the motion of the air just as the piston reaches top dead centre on the compression stroke; and Figures 3 to 6 are fragmentary part-sectional elevations of combustion chambers formed according to the invention and incorporating various distinctive features, the piston in each case being shown near top dead centre where the clearance between the piston and the cylinder head is only that necessary for mechanical reasons.

Like numerals indicate like parts throughout the drawing.

A fuel-injection engine, according to the main feature of the invention, has a compression space so proportioned and arranged that during the earlier part the compression stroke an orderly swirl of air is set up in it about an axis sensibly perpendicular to the cylinder axis and such that during the final part of the compression stroke a second definite swirl is caused in the compression space in a direction opposite to that of the first swirl. Thus, the original swirl may be broken up into two main swirls one of which is in the same direction as the original while the other is in the opposite direction. The fuel-injector preferably has its outlet at the edge or in the stream of one of the final swirls.

The compression space is preferably of compact form mainly outside the cylinder bore and offset from the cylinder axis so that the centre of the compression space is more or less in the line of the adjacent portion of the cylinder bore, the compression space communicating directly with the cylinder bore through an opening having no connecting duct or one of which the length is so small in relation to its cross-sectional area that the duct exerts no dominating effect upon the mean direction of the air flow into the compression space during the compression stroke of the piston, and of which opening the mean plane of entry AB to the combustion chamber is of such aspect that the perpendicular through its centre of area passes nearly through the mass centre of the compression chamber, but preferably below this point, whereby a swirl in a predetermined direction is developed early in the compression stroke.

The fuel injection should commence at the moment approximately when the initial orderly swirl is first interrupted. The fuel should, for preference, be injected across and downstream of the larger of the final swirls rather than upstream, in order to extend the length of the streamer for a given period of fuel injection, though satisfactory results may be obtained if the injection is substantially transverse to this swirl.

A further important feature of the invention consists in this, that the wall of the compression space nearest the cylinder axis makes a right-angle or an acute angle with the appropriate face of the cylinder head, leaving a sharp edge of negligible radius. In this event, during the final portion of the compression stroke when the main rush of air into the compression space is across the face of the piston, intense turbulence is set up beyond the sharp edge. Conversely, during the expansion stroke turbulence is set up on the other side of this sharp edge, thus promoting combustion during the initial combustion and expansion period.

The injector can with advantage be arranged so that some fuel is injected towards this sharp edge; then, when starting, fuel that tends to collect there in drops is blown off during the last stage of the compression stroke and very thoroughly atomized.

In Figures 1 and 2 the arrows represent diagrammatically the air flow in the cylinder bore 20 and in the compression space 21. This latter in this instance has a cylindrical wall portion 22 connected at its outer end remote from the crankshaft to a dome-shaped wall 23. The compression space is a compact one, it will be observed, and its centre is substantially aligned with the wall 24 of the cylinder bore, the compression space being materially offset from the cylinder axis. The opening 25a interconnecting the cylinder bore and the compression space is a relatively wide one of no axial length. The lower wall 26a of the compression space is at a lower level than the underface 27 of the cylinder head. The side 28 of the compression space nearest the cylinder axis makes an angle which is at least as great as 90° with the face 27 of the cylinder head, and it terminates with a sharp edge 29. The radius of this edge should be kept to a minimum, as is possible if the two faces be machined.

It should be noted that during the final portion of the compression stroke the air rushing across the face of the piston, as shown in Figure 2, forms violent local vortices just beyond the sharp edge 29, as indicated at 31. Conversely, at the beginning of the expansion stroke when the main rush of air is again momentarily across the piston face but in the other direction to that shown in Figure 2, intense non-directional turbulence is set up on the other side of the sharp edge 29, such turbulence serving for post-ignition purposes.

During the initial portion of the compression stroke the mean direction of air flow, as indicated by the arrows in Figure 1, is such as to cause clockwise swirl in the compression space. As the piston 30 passes the neighbourhood of the lower wall 26a the mean direction of air flow into the compression space becomes more nearly and at last entirely across the face of the piston, disturbing and cutting across the original swirl, as indicated by the arrows in Figure 2, introducing non-directional turbulence and causing a residual swirl of the same sense as the original in the upper portion of the compression space and a swirl in the opposite direction in the lower portion of the compression space.

With reference to Figure 2, it may here be mentioned that the ratio of the volume of the "dropped" portion of the compression space (i. e., that below the piston face at top dead centre) to the whole of the compression space should for preference be somewhere in the neighbourhood of 0.275 to 1. Increase or decrease beyond this ratio is followed by an increasingly-unsatisfactory performance.

With the above type of engine an orderly swirl is set up in the compression space about an axis which is sensibly perpendicular to the cylinder axis during the initial part of the compression stroke, and during the final part a second definite swirl is set up in the compression space in a direction opposite to that of the first swirl. As a result of this interference some portion of the original orderly swirl is broken up into non-directional turbulence, and these individual vortices are carried round in the final swirls.

In the constructional arrangements illustrated, the compression space 21, it will be observed, is formed in a plug 32 fitted in an appropriate cavity 33 of the cylinder head 34. For the best results to be obtained the centre of the upper portion of the compression space should be within, say, a thirty-second of an inch of the adjacent edge 24 of the cylinder bore in the case of a piston of about four and a half inches diameter and having a stroke of about seven inches.

Figures 3 to 6 show a fuel injector 39 tilted so that the injection will very definitely be downstream of the final swirl. In addition, they show the upper part 40 of the cylinder bore as being formed in the cylinder head.

Figure 4:
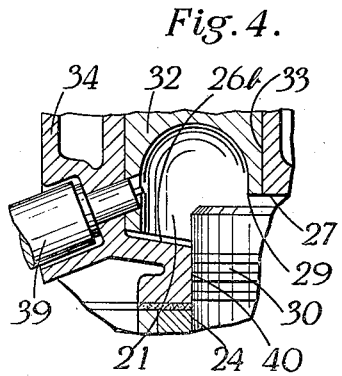
Figure 5:
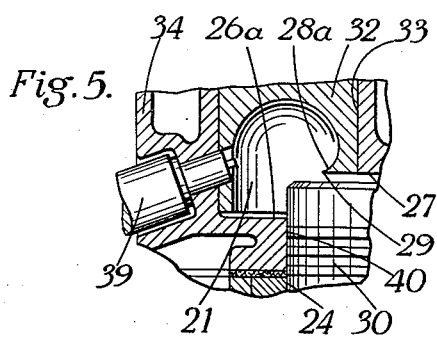
Figure 6:
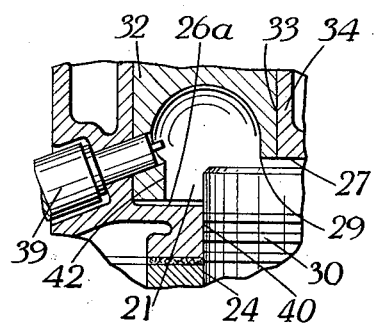

In Figure 4 the lower wall 26b of the compression space is inclined. In Figure 5 the side wall 28a of the compression space nearest the cylinder axis makes an acute angle with the underface 27 of the cylinder head. In Figure 6 the wall 42 of the compression space remote from the cylinder axis is set slightly inwardly.

With all the combustion chambers easy starting and efficient running can be obtained.

What I claim as my invention and desire to secure by Letters Patent of the United States is:—

1. In a fuel-injection engine, a cylinder having a side wall and a top wall with a removed upper corner portion, a casing extending about said removed corner portion and containing a compression space composed of upper and lower portions in which the volume of the lower portion of the compression space is greater than one-fourth of the volume of the whole compression space, said casing including a partly-spherical dome at its upper portion with its center of curvature substantially in line with the side wall of the cylinder and a cylindrical wall extending downwardly from said dome and connecting with the top cylinder wall at one side, said casing having a bottom wall lying externally of the cylinder and connecting with the upper end of the adjacent side cylinder wall, said bottom being spaced at all points appreciably below the plane of the cylinder top wall, and a piston reciprocating in said cylinder and movable upwardly to a top dead center position with its upper edge in close proximity to said top cylinder wall and with a corner portion thereof entering the compression space whereby said piston on the compression stroke will initially set up a large swirl of the compressed air in said compression space when the vertical component of compression is dominant, and subsequently when the piston approaches and reaches its top dead center position with the horizontal component of the air-stream dominant, said piston will crowd the initial swirl upwardly into the upper portion of the compression space and form with the casing and bottom thereof a relatively deep lower portion of the compression space in which the horizontal component sets up an ancillary swirl in an opposite rotary direction to that of the original swirl.

2. In a fuel-injection engine, a cylinder having a side wall and a top wall with a removed upper corner portion, a casing extending about said removed corner portion and containing a compression space composed of upper and lower portions, said cylinder and casing having a wide opening of substantially no axial length leading from the interior of the cylinder simultaneously to both upper and lower portions of the compression space, and the volume of the lower portion of the compression space bearing the ratio to the whole compression space of substantially 0.275 to 1, said casing including a partly-spherical dome at its upper portion with its center of curvature substantially in line with the side wall of the cylinder and a cylindrical wall extending downwardly from said dome and connecting with the top cylinder wall at one side, said casing having a bottom wall lying externally of the cylinder and connecting with the upper end of the adjacent side cylinder wall, said bottom being spaced at all points appreciably below the plane of the cylinder top wall, and a piston reciprocating in said cylinder and movable upwardly to a top dead center position with its upper edge in close proximity to said top cylinder wall and with a corner portion thereof entering the compression space whereby said piston on the compression stroke will initially set up a large swirl of the compressed air in said compression space when the vertical component of compression is dominant, and subsequently when the piston approaches and reaches its top dead center position with the horizontal component of the air-stream dominant, said piston will crowd the initial swirl upwardly into the upper portion of the compression space and form with the casing and bottom thereof a relatively deep lower portion of the compression space in which the horizontal component sets up an ancillary swirl in an opposite rotary direction to that of the original swirl.

3. In a fuel-injection engine, a cylinder having a side wall and a top wall with a removed upper corner portion, a casing extending about said removed corner portion and containing a compression space composed of upper and lower portions, said casing including a partly-spherical dome at its upper portion with its center of curvature substantially in line with the side wall of the cylinder and a cylindrical wall extending downwardly from said dome and connecting with the top cylinder wall at one side, said cylindrical wall of the casing making an acute angle with the underface of said top wall of the cylinder, leaving a sharp arcuate edge of negligible radius, said casing having a bottom wall lying externally of the cylinder and connecting with the upper end of the adjacent side cylinder wall, said bottom being spaced at all points appreciably below the plane of the cylinder top wall, and a piston reciprocating in said cylinder and movable upwardly to a top dead center position with its upper edge in close proximity to said top cylinder wall and with a corner portion thereof entering the compression space whereby said piston on the compression stroke will initially set up a large swirl of the compressed air in said compression space when the vertical component of compression is dominant, and subsequently when the piston approaches and reaches its top dead center position with the horizontal component of the air-stream dominant, said piston will crowd the initial swirl upwardly into the upper portion of the compression space and form with the casing and bottom thereof a relatively deep lower portion of the compression space in which the horizontal component sets up an ancillary swirl in an opposite rotary direction to that of the original swirl.

ARTHUR FREEMAN SANDERS.